United States Patent [19]

Cooper

[11] Patent Number: 4,960,400
[45] Date of Patent: Oct. 2, 1990

[54] GAME CALL

[76] Inventor: Gary L. Cooper, HC-04, Box 62, Pocahontas, Ark. 72455

[21] Appl. No.: 437,586

[22] Filed: Nov. 17, 1989

[51] Int. Cl.⁵ .............................................. A63H 5/00
[52] U.S. Cl. ................................................... 446/207
[58] Field of Search ............... 446/207, 208, 209, 202, 446/203, 204, 206; 43/1, 2

[56] References Cited

U.S. PATENT DOCUMENTS

| | | | |
|---|---|---|---|
| 691,131 | 1/1902 | Gay | 446/202 |
| 2,504,264 | 4/1950 | Jackson | 446/207 |
| 4,341,037 | 7/1982 | Moss | 446/204 |
| 4,483,097 | 11/1984 | Piper | 446/207 |
| 4,850,925 | 7/1989 | Ady | 446/207 |

Primary Examiner—Mickey Yu
Attorney, Agent, or Firm—Polster, Polster and Lucchesi

[57] ABSTRACT

A game call of the type known as a mouth call, has a plurality of generally elongatedly rectangular, planar, thin, flexible diaphragms secured at opposite short edges in a frame, the diaphragms lying adjacent one another in substantially the same plane, each of the diaphragms having a trailing and a leading long edge, the trailing edge of the diaphragms being substantially parallel to and spaced from the leading edge of the next successive diaphragm.

9 Claims, 2 Drawing Sheets

U.S. Patent  Oct. 2, 1990  Sheet 1 of 2  4,960,400
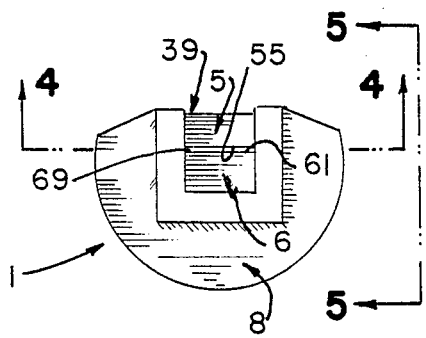
FIG. 1.
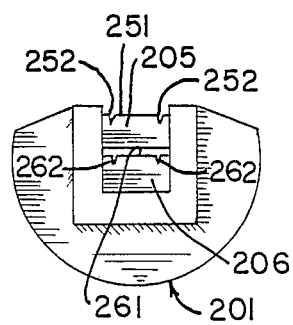
FIG. 2.
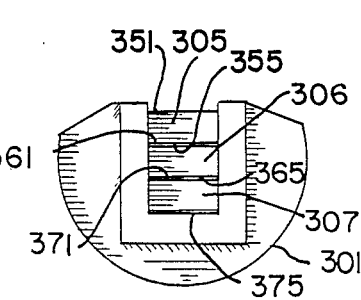
FIG. 3.
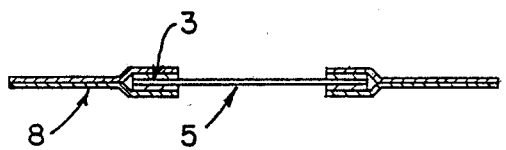
FIG. 4.
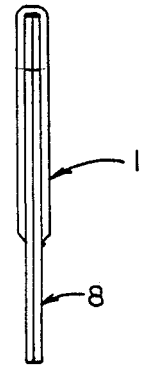
FIG. 5.
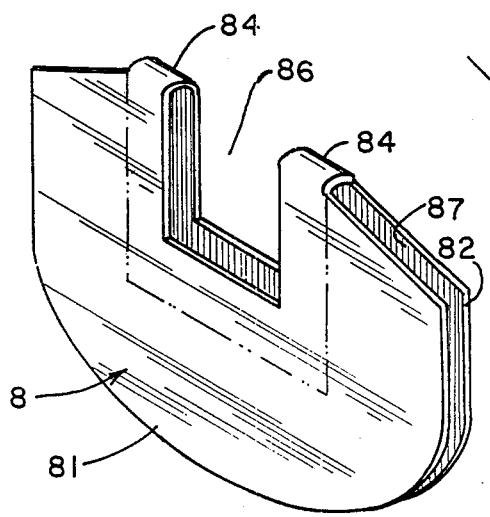
FIG. 6.
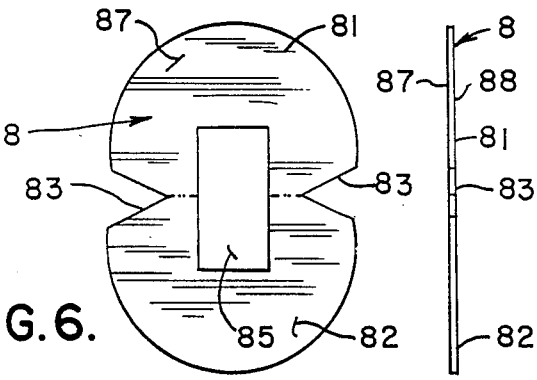
FIG. 7.
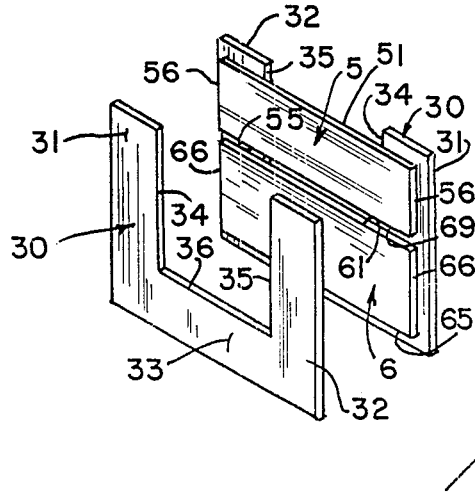
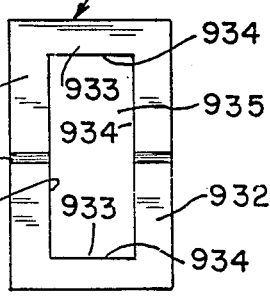
FIG. 9.
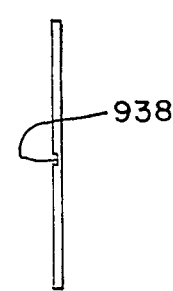
FIG. 10.

GAME CALL

BACKGROUND OF THE INVENTION

This invention relates to game calls of the type commonly referred to as mouth calls, and particularly to such calls with a plurality of diaphragms or reeds. This is a crowded art, but as far as applicant is aware, all of the plural-diaphragm calls known heretofore have had the diaphragms either touching or spaced in an overlapped manner. These calls have had the disadvantages that the diaphragms can stick together, that the diaphragms are not readily manipulated by the tongue separately, and that if the call is accidentally swallowed, it effectively blocks the passage of air past it in the esophagus. Those that are stacked also are bulkier than a single diaphragm call.

One of the objects of this invention is to provide a plural reed call that is as slim as a single reed call.

Another object is to provide such a call that is more flexible in achieving realistic frequency responses than calls known heretofore.

Anther object is to provide such a call that is comfortable to use, reliable, consistent, and maintenance free.

Yet another object is to provide such a call that is safe in providing a passage for breath in case the call should become lodged in the esophagus.

Other objects of this invention will be apparent to those skilled in the art in light of the following description and accompanying drawings

SUMMARY OF THE INVENTION

In accordance with this invention, generally stated, a game call is provided in which a plurality of generally elongated, planar, thin, flexible diaphragms, secured at opposite short edges in a frame, lie adjacent one another in substantially the same plane. Each of the diaphragms has a trailing edge and a leading edge, the leading edge of successive diaphragms being substantially parallel to and spaced from the trailing edge of the immediately adjacent diaphragm. The diaphragms can be of the same width or of different widths, and one or both of the leading and trailing edges can be uninterrupted or notched. The frame in which the diaphragms are mounted is preferably rectangular, with an open mouth. It can be made in one piece, elongatedly rectangular, and folded along a transverse center line, the diaphragms being mounted between opposite parallel legs of the folded frame. It can be seen that in such a construction, the thickness of the call is the same as the thickness of a single diaphragm or reed call. It is also evident that with the spacing of the reeds, even if the call should be lodged transversely of the esophagus, there is space between the reeds for the passage of breath.

The provision of reeds spaced from one another in a single plane permits the achievement of realistic frequency responses, flexible tonal responses, comfort, reliability, consistency, and a lack of maintenance, as well as safety as has been indicated. It permits air to be directed by the tongue over or under the full length of one or more of the reeds to provide the user with a frequency manipulation previously impossible. The successive reeds may be tuned differently from one another. In any case, air leaving the first reed modulates before contacting the second reed, which further modulates the air running over, under or on both sides of the second reed. This results in completely unique frequency patterns. The use of the rectangular frame allows the tongue to manipulate a greater area with improved tonal resonance. The reeds can not possibly stick to one another, so that the call of this invention is easy to maintain, and provides greater consistency than the stacked reed calls known heretofore. Although the reeds are described as planar, the individual reeds may be layered or tapered, split or notched in ways with which those skilled in the art are presently familiar. The frame may be made of aluminum, plastic, or other material. A yoke to block air leakage around the call may be made of flexible tape as is commonly employed. The call of this invention can be used to communicate with almost any kind of bird or game animal, because of the range of sounds that can be generated.

BRIEF DESCRIPTION OF THE DRAWINGS

In the drawings, FIG. 1 is a top plan view of one embodiment of game call of this invention;

FIG. 2 is a top plan view of a second embodiment;

FIG. 3 is a top plan view of a third embodiment;

FIG. 4 is a sectional view taken along the line 4—4 of FIG. 1;

FIG. 5 is a view in side elevation taken along the line 5—5 of FIG. 1;

FIG. 6 is an exploded view of the call of FIG. 1 before it is fully assembled;

FIG. 7 is a top plan view of a yoke shown folded in FIG. 6;

FIG. 8 is a view in side elevation of the yoke shown in FIG. 7;

FIG. 9 is a top plan view of a second embodiment of frame;

FIG. 10 is a view in side elevation of the frame shown in FIG. 9.

DESCRIPTION OF THE PREFERRED EMBODIMENT

Figure 11:
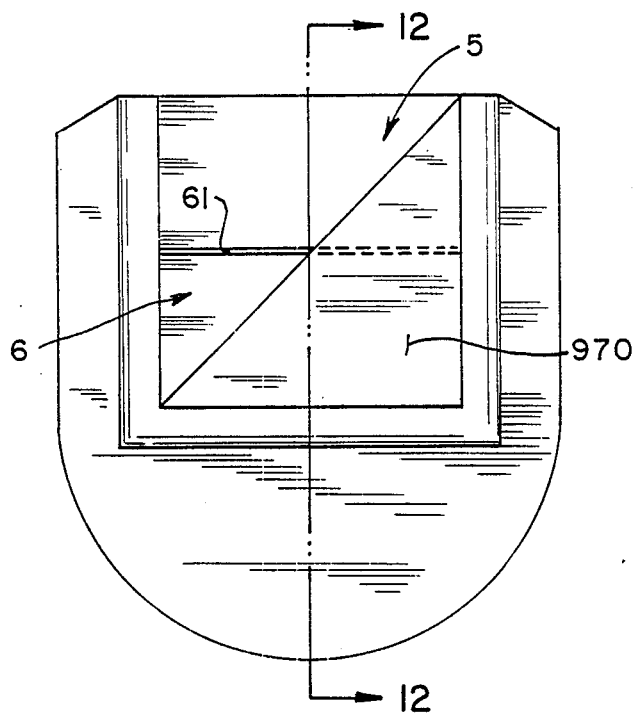
FIG. 11 is a top plan view of another embodiment of call of this invention.

Referring to FIGS. 1 and 4 through 8, for one embodiment of game call of this invention reference numeral 1 indicates a completed call, made up of a frame 3, diaphragms 5 and 6, and a yoke 8.

In this embodiment, the frame 3 is made up of two identical U-shaped frame members 30, each with legs 31 and 32 and a cross-piece 33. An inside edge 34 of leg 31, a parallel facing inside edge 35 of leg 32, and an inside edge 36 of cross-piece 33, perpendicular to the edges 34 and 35, define, when the frame is assembled, a rectangular opening with an open mouth 39.

The diaphragm or reed 5 is, as shown particularly in FIG. 6, substantially elongatedly rectangular, with a trailing edge 51, a leading edge 55, and side edges 56. The thickness of the diaphragms 5 and 6 is exaggerated in FIG. 6; in practice, the diaphragms will be on the order of 5 mils thick, whereas the two frame members can be on the order of 20 mils or more.

The diaphragm 6 has a trailing edge 61, a leading edge 65 and side edges 66.

As shown particularly in FIG. 6, the diaphragms 5 and 6 are adhered to and sandwiched between the legs 31 and 32 of the frame members 30, with the long sides 51 and 55 and 61 and 65 parallel to one another and substantially perpendicular to the inner edges 34 and 35, hence parallel to the edge 36 of the frame members. The leading edge 55 of the diaphragm 5 is spaced from the trailing edge 61 of the diaphragm 6, to leave a gap 69 between them.

In this embodiment, the reed 5 is wider, in the direction of the flow of breath toward the mouth 39, than the reed 6. The reed 5 is secured only at an area immediately inboard of the short side edges 56. The diaphragm 6 is secured at an area immediately inboard of the short edges 66, but can also be adhered to the cross-piece 33, or, alternatively, can terminate short of the edge 36 of the cross-piece 33.

The yoke 8, made of an impervious tape with one adhesive surface 87, and one smooth outer surface 88, has an upper lobe 81 and a lower lobe 82, with a triangular notch 83 on both sides at the center line. A rectangular window 85 is centered between the notches and on a longitudinal center line. Long edges defining the rectangular window and the apices of the notches 83 defined between them a closure web or strap 84 when the yoke is folded as illustrated in FIG. 6. When the yoke 8 is folded as shown in FIG. 6, the window 85 defines an open mouth 86 substantially coincident with the mouth 39 of the frame, as are the side edges of the window 85 and the edges 34 and 35 of the frame.

Referring now to FIG. 2 for a second embodiment, a game call 201 is provided that is identical in every respect with the call shown in FIG. 1 except that a diaphragm 205 has a trailing edge 251 with notches 252 in it, and a diaphragm 206 has a trailing edge 261 with notches 262 in it.

Referring now to FIG. 3 for a third embodiment, a game call 301 is shown as provided with three diaphragms numbers 305, 306 and 307. The diaphragm 305 has a trailing edge 351 and a leading edge 355. The diaphragm 306 has a trailing edge 361 and a leading edge 365. The diaphragm 307 has a trailing edge 371 and a leading edge 375. As is the case in the embodiments of FIGS. 1 and 2, the diaphragms 305, 306, and 307 extend transversely of a frame, parallel with one another and perpendicular to the inner edge of a frame. The leading edge 355 of the diaphragm 305 is spaced from the trailing edge 361 of the diaphragm 306, and the leading edge 365 of the diaphragm 306 is spaced from the trailing edge 371 of the diaphragm 307. In this embodiment, the leading edge 375 of the diaphragm 307 is spaced from a cross-piece inner edge of the frame.

Referring now to FIG. 9 and 10 for another embodiment of frame member, a one piece frame 903 has parallel legs 931 and 932 and parallel cross-pieces 933 perpendicular to the legs 931 and 932. Inside edges 934 of the legs and cross-pieces define a rectangular opening 935. The frame 903 is preferably made of plastic and is formed, as by hot scoring or the like, with a web 938 midway of the height of the legs, as shown in FIGS. 9 and 10. In assembling a call made with the frame 903, the diaphragms are adhered to one half of the legs 931 and 932, in a way similar to that of the part 30 shown in FIG. 6, and the other half of the frame is folded over so as to sandwich the diaphragms between the two sets of legs. The only difference in the assembled product will be that the web 938 will form a strap analogous to the strap 84 of the yoke 8.

In either case, the assembled frame and diaphragms are placed on the adhesive surface 87 of one of the lobes 81 or 82, of the yoke 8, and the other half is folded over as illustrated in FIG. 6, and the margins of the yoke pressed together to seal the space around the frame, as illustrated in FIGS. 4 and 5.

The diaphragms, which can be made of surgical rubber or the like, can be tuned by tensioning them, as well as by varying the width or thickness of the diaphragms.

Figure 12:
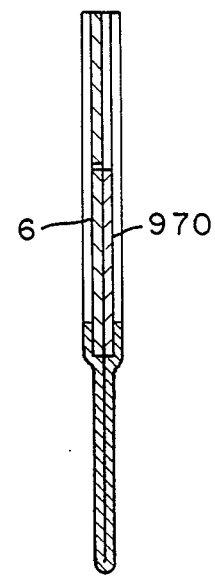
FIG. 12 is a sectional view taken along the line 12—12 of FIG. 11.

The diaphragm arrangement of this invention can also be used in combination with overlying diaphragms, preferably if the overlying diaphragm does not obstruct the entire space between the planarly arranged diaphragms. One such arrangement is illustrated in FIGS. 11 and 12, where diaphragms 5 and 6 of the embodiment shown in FIG. 1 are partially overlain on one side by a triangular diaphragm 970. It will be observed that only half of the trailing edge of the diaphragm 6 and of the leading edge of the diaphragm 5 and none of the trailing edge of the diaphragm 5 are overlain, and that on only one, wide side of the diaphragms 5 and 6. The provision of the triangular diaphragm 970 produces a wheezing sound that is effective in calling deer.

Figure 13:
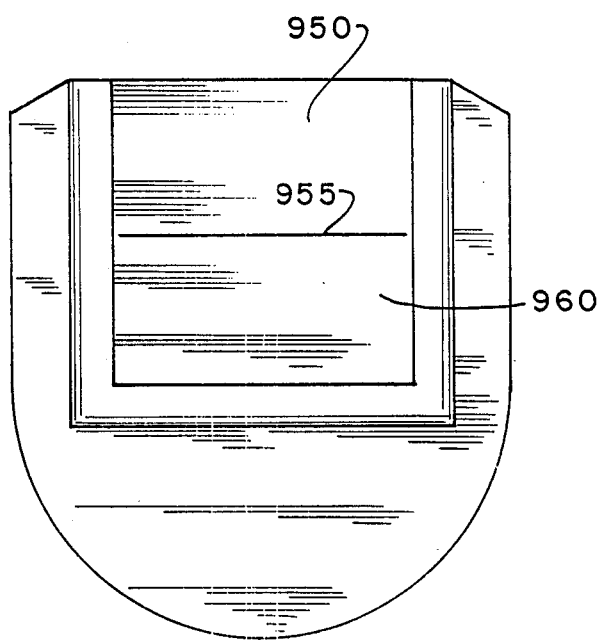
FIG. 13 is a top plan view of still another embodiment of call of this invention.

Still another embodiment is shown in FIG. 13, where diaphragms 950 and 960, corresponding to the diaphragms 5 and 6 of the first embodiment, are defined by a cut 955 in a single rectangular sheet of thin diaphragm material, the cut extending substantially to the inner edges of the frame, leaving a continuous margin of the diaphragm material sandwiched between frame members such as the frame members 30 or 903. The cut can be of any desired width in the direction of the breath flow.

Numerous variations in the construction of the call of this invention, within the scope of the appended claims, will occur to those skilled in the art in the light of the foregoing disclosure. Merely by way of example, the frame or harp can be made in a conventional oval shape, or with a still different configuration in which the lengths of the successive reeds are different, but the rectangular frame illustrated and described has advantages of simplicity and effectiveness. More than three reeds can be used, so long as the leading edge is spaced from the trailing edge of the next successive reed. The reeds may be mounted by gluing, or mechanically, as by crimping, laminating or "welding". The reeds are generally rectangular, but the edges may be interrupted, as shown in FIG. 2, or may be curved slightly if desired, and still be generally rectangular. The successive edges may also be slightly canted with respect to one another, or with respect to the direction of breath flow, if that is found to be desirable. The space between the successive reeds can be varied. It has been found that a space of approximately one millimeter is effective, but the space can be made somewhat less, as, for example, 0.1 mm., or greater, for example 1.5 mm. The reeds preferably lie precisely in the same plane, but if the frame were slightly warped, or one reed were laminated on one side to increase its thickness or rigidity, the reeds may not lie precisely in the same plane, but nevertheless be in substantially the same plane. These are merely illustrative.

Having thus described the invention, what is claimed and desired to be secured by Letters Patent is:

1. A game call comprising a plurality of generally elongatedly rectangular, planar, thin, flexible diaphragms secured at opposite short edges thereof in a frame, said diaphragms lying adjacent one another in substantially the same plane, said diaphragms having trailing and leading long edges, the leading edge of successive diaphragms being spaced from the trailing edge of the immediately adjacent diaphragm.

2. The game call of claim 1 wherein at least one of said trailing and leading edges is notched.

3. The game call of claim 1 wherein the said diaphragms are of different widths with respect to the intended direction of breath flow.

4. The game call of claim 1 wherein said frame is rectangular with one open side.

5. The game call of claim 4 wherein said frame is in one piece, elongatedly rectangular and folded along a transverse center line, said diaphragms being mounted between opposite parallel legs of said folded frame.

6. The game call of claim 1 wherein said diaphragms are part of a single sheet of diaphragm material, and successive diaphragms are defined by a cut extending transversely with respect to the intended direction of breath flow, short of side margins of the said sheet, whereby an uninterrupted margin of said sheet is secured in said frame.

7. The game call of claim 1 including an overlying diaphragm, overlying at least a part of the broad side of one or more of said diaphragms.

8. The game call of claim 7 wherein said overlying diaphragm is triangular, with its base along a closed part of said frame, and its apex at one corner of an open mouth of said frame.

9. A game call comprising a plurality of generally elongated, planar, thin, flexible diaphragms secured at opposite short edges thereof in a frame, said diaphragms lying adjacent one another in substantially the same plane, said diaphragms having trailing and leading long edges, the leading edge of successive diaphragms being spaced from the trailing edge of the immediately adjacent diaphragm.

* * * * *